United States Patent [19]

Ameer

[11] Patent Number: 5,434,697
[45] Date of Patent: Jul. 18, 1995

[54] DEFORMABLE MIRROR SYSTEM HAVING REPLACEABLE ACTUATORS

[75] Inventor: George A. Ameer, Andover, Mass.

[73] Assignee: Litton Systems, Inc., Lexington, Mass.

[21] Appl. No.: 281,378

[22] Filed: Jul. 27, 1994

[51] Int. Cl.⁶ ............................................. G02B 26/08
[52] U.S. Cl. .................................... 359/224; 359/849
[58] Field of Search ................ 359/215, 224, 225, 845, 359/846, 849

[56] References Cited

U.S. PATENT DOCUMENTS

| | | | |
|---|---|---|---|
| 3,904,274 | 9/1975 | Feinleib et al. | 350/161 |
| 4,906,087 | 3/1990 | Ealey et al. | 350/611 |
| 4,923,302 | 5/1990 | Ealey et al. | 356/371 |
| 4,932,119 | 6/1990 | Ealey et al. | 29/593 |
| 4,940,318 | 7/1990 | Ealey et al. | 350/611 |
| 4,944,580 | 7/1990 | Bruce et al. | 359/849 |
| 5,037,184 | 8/1991 | Ealey | 359/849 |
| 5,037,190 | 8/1991 | Ealey et al. | 359/849 |
| 5,245,734 | 9/1993 | Issartel | 29/25.35 |

FOREIGN PATENT DOCUMENTS 7340515  6/1989  Germany ........................ 359/849

*Primary Examiner*—Loha Ben
*Assistant Examiner*—Steve Kong
*Attorney, Agent, or Firm*—Michael H. Wallach

[57] ABSTRACT

A deformable mirror system comprises a reflective face sheet, substrate, positioned behind the face sheet, having actuator bore holes extending entirely through the substrate. Actuator assemblies for deforming the face sheet are positioned in a different ones of the actuator bore holes and are bonded to both a back surface of the face sheet and to the substrate. The actuator assemblies each comprise a tile bonded to a back surface of the substrate to close a distal end of the actuator bore hole and an actuator bonded to the tiles, extending through the bore hole, and bonded to the face sheet near a proximal end of the bore hole. These assemblies can then be individually removed by destroying the adhesive quality of these bonds.

13 Claims, 4 Drawing Sheets

DEFORMABLE MIRROR SYSTEM HAVING REPLACEABLE ACTUATORS

BACKGROUND OF THE INVENTION

Deformable mirrors are reflectors that can adaptively change their surface curvatures. Usually, these changes can be accomplished in real-time in response to changes in the signal reflected by the surface. One application for deformable mirrors is correcting for aberrations introduced into a signal resulting from transmission through a distorting medium. For example, such mirrors may be used to correct for aberrations introduced into optical signals imaged by an earthbound telescope due to turbulence in the atmosphere above the telescope.

Examples of deformable mirrors are described in U.S. Pat. Nos. 3,904,274 and 4,657,358, which are owned by the assignee of the present invention and the teachings of which are incorporated herein by reference. Basically, these deformable mirrors have face sheets and actuators that connect a back surface of the face sheet to a rigid substrate. The actuators are usually formed from an electrodistortive material that will change its physical characteristics in response to an electrical signal.

The actuators or electrodisplasive transducers are usually made of lead magnesium niobate (PMN) or lead zirconate titanate (PZT). Layers of one of these chemicals are interleaved in a stack with layers of electrical conductors. The arrangement of the electrical conductors permits electrical connections to alternate conductors. Consequently, electrical fields can be established across each layer of the chemical. These electrical fields cause the chemical to either expand or contract. A method for making the electrodisplasive transducers is described in U.S. Pat. No. 4,932,119, which is owned by the assignee of the instant invention and incorporated herein by reference.

SUMMARY OF THE INVENTION

Basically, the present invention is directed to positioning actuator assemblies in bore holes which extend entirely through the substrate. The assemblies are then bonded to both the face sheet and the substrate near distal ends of the bore holes. These assemblies can then be individually removed by destroying the adhesive quality of these bonds.

As such, in general, according to one aspect, the invention features a deformable mirror system that comprises a reflective face sheet and a substrate, positioned behind the face sheet, having actuator bore holes extending entirely through the substrate. Actuator assemblies for deforming the face sheet are positioned in a different ones of the actuator bore holes and are bonded to both a back surface of the face sheet and to the substrate.

In specific embodiments, the actuator assemblies each comprise a tile bonded to a back surface of the substrate to close a distal end of the actuator bore hole and an actuator being bonded to the tiles, extending through the bore hole, and being bonded to the face sheet near a proximal end of the bore hole.

In other embodiments, the actuator assemblies are bonded to the substrate and comprise actuators that extend through the bore holes and are bonded to the face sheet near a proximal end of the bore holes.

In still other embodiments, the reflective face sheet comprises a front surface, which is reflective to electromagnetic radiation, and an opposed back surface. A plurality of raised buttons are arrayed in a pattern on the back surface which corresponds to the actuator bore holes of the substrate. Each of the actuator assemblies engages a different one of the raised buttons. Ideally, the substrate is formed from low expansion glass.

In general, according to another aspect, the invention features a method for removing an individual one of the actuator assemblies in the deformable mirror system describe above. This method comprises exposing a bond between the actuator assembly and the face sheet to electromagnetic radiation to destroy an adhesive quality of the bond and exposing a bond between the actuator assembly and the substrate to electromagnetic radiation to destroy the adhesive quality of this other bond. Then, the actuator assembly may be removed.

In specific embodiments, the electromagnetic radiation is ultra-violet radiation and generated by an excimer laser.

The above and other features of the invention including various novel details of construction and combinations of parts, and other advantages, will now be more particularly described with reference to the accompanying drawings and pointed out in the claims. It will be understood that the particular method and device embodying the invention is shown by way of illustration and not as a limitation of the invention. The principles and features of this invention may be employed in various and numerous embodiments without the departing from the scope of the invention.

BRIEF DESCRIPTION OF THE DRAWINGS

In the accompanying drawings, like reference characters refer to the same parts throughout the different views. The drawings are not necessarily to scale, emphasis instead being placed upon illustrating the principles of the invention. Of the drawings.

DETAILED DESCRIPTION OF THE DRAWINGS

Figure 1:
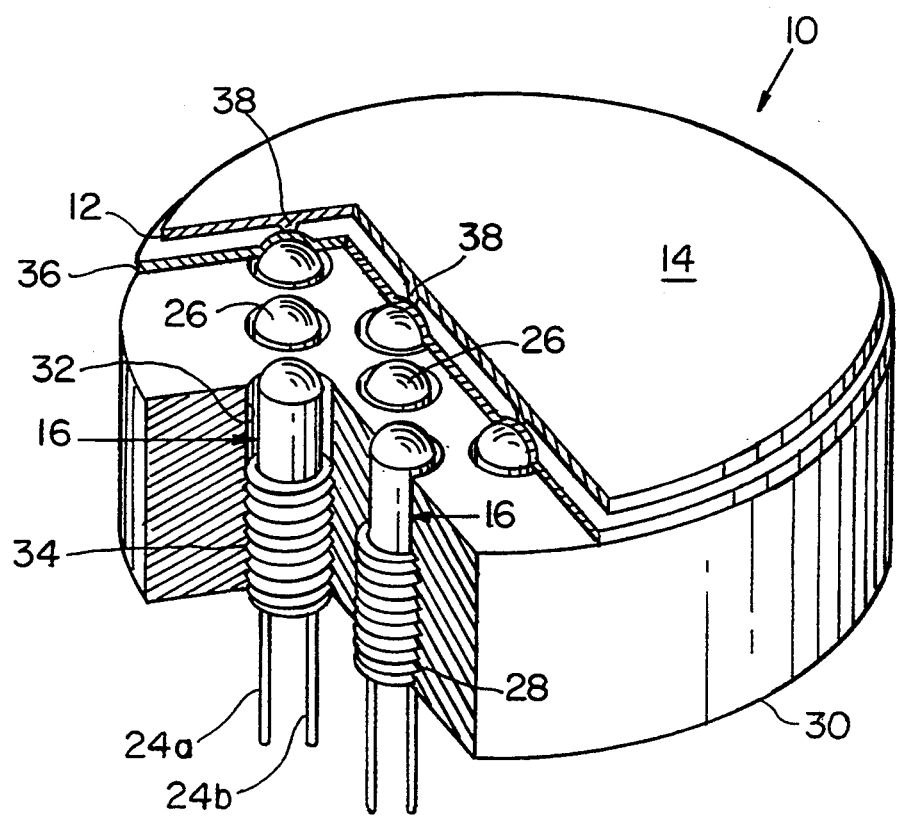
FIG. 1 is a perspective view of a prior art deformable mirror system.

A challenge in designing deformable mirrors is creating a configuration that enables replacement of individual actuator assemblies after the construction of the mirror is completed. The capability for this type of repair is necessary for a number of reasons. The actuators are constructed of layers of electrodistortive material that are joined together by a frit bond and then fired in an oven. Actuators of such construction are prone to failure at the joints between the successive layers of the electrodistortive material, especially when such joints also contain an electrically conductive layer such as platinum paint. Another common problem is the failure of the electrical contacts to the conductive layers between the electrodistortive material. Such failure yields a decrease in the stroke of the actuator, the total distance that the actuator can move the face sheet. Still another problem is the incorrect calibration of the length of one of the actuators. Since the mirror is distorting light, its surface curvature must be finely controlled to on the order of the wavelength of the light. Therefore, in the context of the mirror for visible light, the lengths of the actuators must be accurate to at least thousands of nanometers. Actuators that were discovered to be too long or too short after the manufacture of the mirror must be replaced with actuators of the proper length.

Finally, the large numbers of actuators in combination with the various modes of failure create a substantial likelihood that a particular system will require repair. For example, it is reasonable to expect that a system will require actuators spaced less than 1.0 cm apart from each other. In an optical system having an aperture of 0.5 meters, this degree of surface control requires 2,300 or more independent actuators. It would be very inefficient to dispose of an entire deformable mirror due to the failure or incorrect calibration of a few of these actuators.

A deformable mirror system that enables individual actuator replacement is disclosed in U.S. Pat. No. 4,940,318, which is owned by the assignee of the instant invention and incorporated herein by this reference. This system 10, illustrated in the instant FIG. 1, includes a base 30 in which apertures 32 are formed. Actuators 16 have plug ends 28 which can be screwed into lower threaded portions 34 of the apertures 32. Conical or dome-shaped push rods 26 of each actuator 16 engage a retraction membrane 36 which is bonded to the base to act as a mechanical spring to place each actuator 16 under a compressive load at all times. A face sheet 12 having a reflective side 14 is then bonded to the retraction membrane 36 at pushpads 38, which are located above each actuator 16. The retraction membrane 36 serves as an electromechanical interface between the actuator 16 and the face sheet 12.

In the invention of FIG. 1, new actuators 16 are installed by screwing the actuators 16 into the base 30. As a result during the initial assembly, the heights of each actuator must be calibrated by adjusting the depth of every one of the plug ends in the base 30. Because of this problem, a method and apparatus for calibrating deformable mirrors having replaceable actuators was developed and disclosed in U.S. Pat. No. 4,932,302 which is owned by the assignee of the instant invention and incorporated herein by this reference. A further disadvantage with this design is that the retraction membrane 36 is required in the mechanical engagement between the actuators and the back of the face plate 12.

Another solution to the replaceable actuator problem is disclosed in U.S. Pat. No. 4,906,087, which is owned by the assignee of the instant invention and which is also incorporated herein by this reference. The invention described in this patent has the advantage that the necessity of the retraction membrane has been overcome but complexity added by requiring small magnetic couplings between the back surface of the face plate and the top of each one of the actuators.

Figure 2:
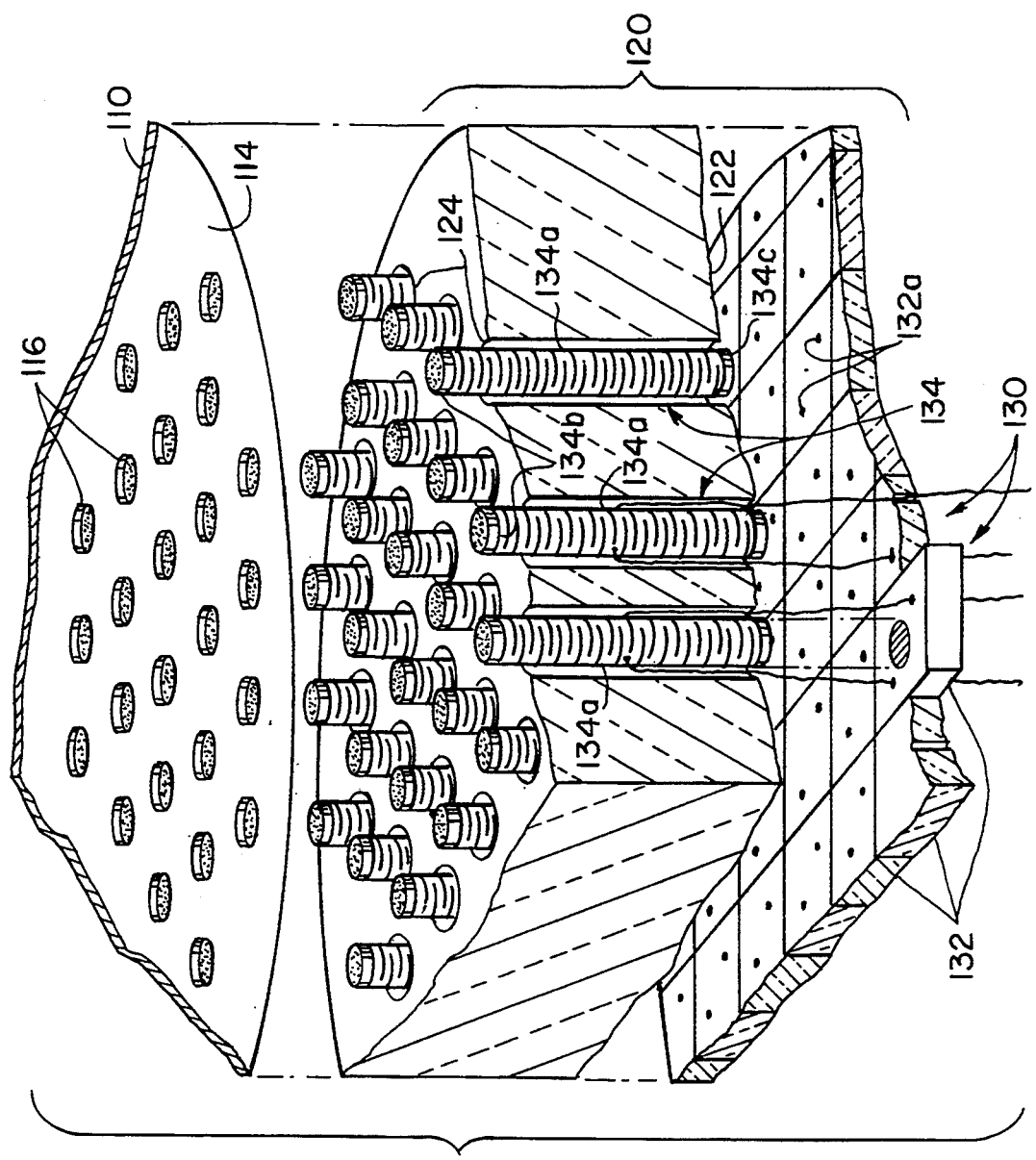
FIG. 2 is an exploded schematic and partial cross-sectional view of a deformable mirror system of the present invention.

FIG. 2 illustrates a deformable mirror system constructed according to the principles of the present invention which overcomes the above-identified problems associated with the prior art systems. Generally, the deformable mirror system includes a face sheet 110 and a base 120. The face sheet 110 has a front surface 112, not shown in this view, which is coated with a reflective material, such as aluminum or silver. A rear surface 114 of the face sheet 110 has raised buttons 116 in a regular or grid pattern.

The base 120 includes a substrate 122 of low expansion glass in which a regular array of bore holes 124 have been drilled completely through the substrate. The array of bore hole 124 matches the pattern of raised buttons 116 so that a proximal end of a bore hole is positioned under each one of the buttons of the face sheet. Actuator assemblies 130 comprise individual tiles 132 that are bonded to the substrate to cover the distal ends of each one of the bore holes. The tiles 132 are also made from low expansion glass. Actuators 134 of the assemblies 130 are then positioned in each one of the bore holes 124 and bonded to a respective tile 132 and button 116.

Figure 3:
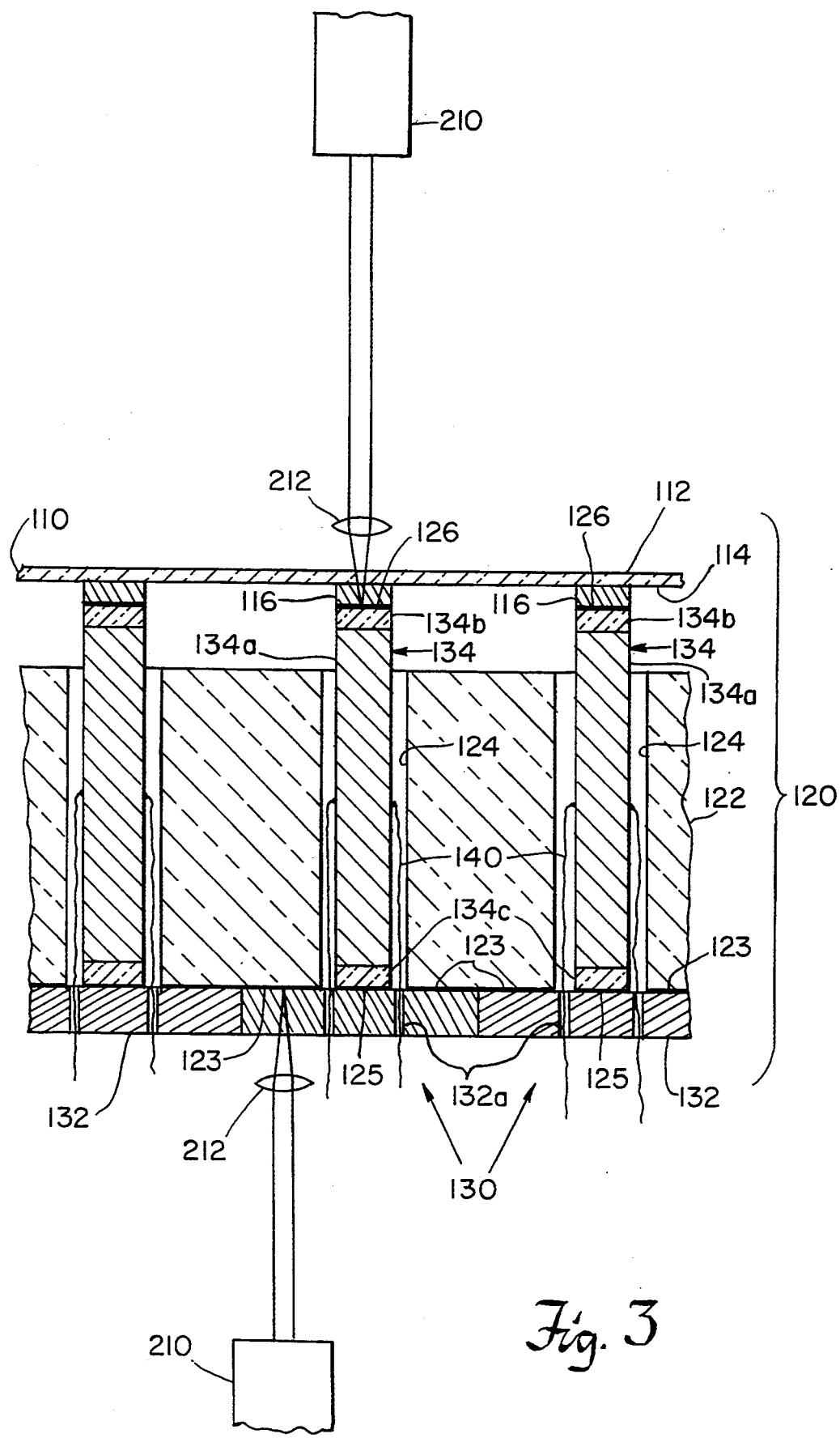
FIG. 3 is a cross-sectional view of a few exemplary actuator assemblies of the present invention and an illustration of an inventive technique for removing an individual actuator assembly.

Cross-sectionals of exemplary actuator assemblies 130 are shown in FIG. 3. Here, an actuator-button epoxy bond 126 between the top of the actuator 134 and the button 116 of the face sheet is shown in addition to an actuator-tile epoxy bond 125 between the bottom of the actuator and the tile 132. Finally, a tile-substrate epoxy bond 123 is shown between the tile 132 and the substrate 122.

The actuators comprise a mid-section 134a constructed of the layered electrodistortive material, preferably PMN. PMN has certain advantages in that it is less subject to strain and creep than PZT. The actuators also include a top ceramic end 134b which is bonded to the button 116 and a bottom ceramic end 134c that is bonded to the tile 134.

Electrical circuitry for driving the actuators is usually positioned underneath the base 120. Electrical connections are then made to the individual actuators by wires 140 or wire wrap pins that extend through holes 132a formed in the tiles 132. The wires then connect to the midsection 134a of the actuators 134.

To replace an individual actuator assembly 130 after the construction of the deformable mirror system, the actuator-button epoxy bond 126 and the tile-substrate bond 123 of a given actuator assembly must be cut. This cutting is accomplished by destroying the adhesive quality of the epoxy cement of the epoxy bonds. Focused ultra-violet light from an excimer laser will convert the epoxy cement to a paste-like consistency.

Each of the epoxy bonds can be illuminated by the laser because the low expansion glass of the substrate and tiles is transparent to the ultra-violet radiation. As illustrated in FIG. 3, the tile-substrate epoxy bond 123 can be destroyed by directing the ultra-violet radiation from the excimer laser 210, a beam of which is focused by lens 212, through the tile and onto the bond. In the case of the actuator-button epoxy bond 126, the ultra-violet radiation must pass through the front surface of the face sheet. Therefore, the reflective material of the front surface 112 of the face sheet 110 must first be removed. Removal can be accomplished by vaporizing the material with the laser 210.

The laser is not the only means for cutting the epoxy bonds 126, 123, and 125. For example, wire filaments could be placed in the epoxy bonds. An electrical current could then be generated in the filaments to heat and destroy the surrounding epoxy cement. The electrical current could be generated by directly connecting the filaments to a voltage source or by a non-contact method such as using focused microwave energy to induce current in the filaments, for example. Another option is to place ferro-magnetic particles in the epoxy cement and then heat these particles by an induction heating method. Still further, a microblow torch could be used to heat the region of the face plate or tile above the epoxy bonds to create local heating which will destroy the adhesive quality of the epoxy cement.

A number of advantages are associated with the present invention. Most obviously, the present invention provides a simple design while still enabling individual actuator replacement. Neither bore hole threading nor a retraction membrane is necessary. Further, no special magnetic coupling is necessary between the actuators and the back of the face sheet.

Moreover, in most actuator assemblies, there are two series epoxy bonds, i.e., between the actuator and the face sheet and between the actuator and the substrate or plug. These bonds expand and contract in response to temperature changes. Other parts such as the substrate and face sheet are usually nonresponsive since they are made from low expansion glass or Invar. The actuator material is also resistant to temperature changes. As a result, any distortion because of temperature is caused by the epoxy bonds. In the present invention, the expansion of the epoxy bonds between the actuator and the face plate and between the actuator and the tile are compensated, in part, by expansion in the bond between the tile and the substrate. As a result, temperature dependent expansion is decreased over most conventional designs.

Another advantage of the present invention is that the heights of the actuators 134 can be easily calibrated. That is, during manufacture the actuators 134 are installed on the tiles in the substrate. Then, a small spacer is placed on the substrate 122 having a thickness equal to the desired height of the actuators above the substrate. The top ceramic ends 134b of the actuators are thereafter sanded or lapped at the level of the spacer so that they all have a uniform height. The spacer is removed and the face sheet 110 cemented to each of the actuators. Consequently, the precise calibration by controlling the depth to which each of the actuators is screwed into the base is avoided. Therefore, the apparatus for calibrating deformable mirrors having replaceable actuators, described in the U.S. Pat. No. 4,932,302, is not necessary.

Still another advantage is the fact that the actuators are epoxied directly to the back of the face sheet. Therefore, the actuators can "pull" the face plate without the necessity for the retraction membrane or magnetic coupling.

Figure 4:
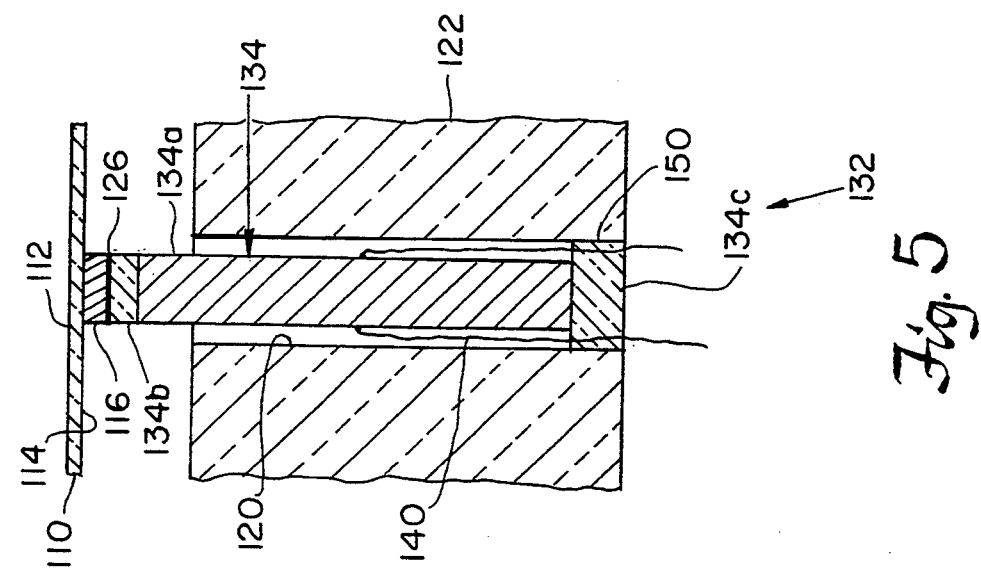
FIG. 4 is a cross-sectional view of an alternative embodiment of the actuator assembly of the present invention.

FIG. 4 shows an alternative embodiment of the actuator assembly 130. As the size of the deformable mirror system increases, the thickness of the substrate must also increase to provide a rigid base from which each of the actuator assemblies 130 can push. In such situations a longer bottom ceramic end 134c', or a post machined as part of the tile, may be necessary so that the actuator 134 extend entirely through the substrate 122.

Figure 5:
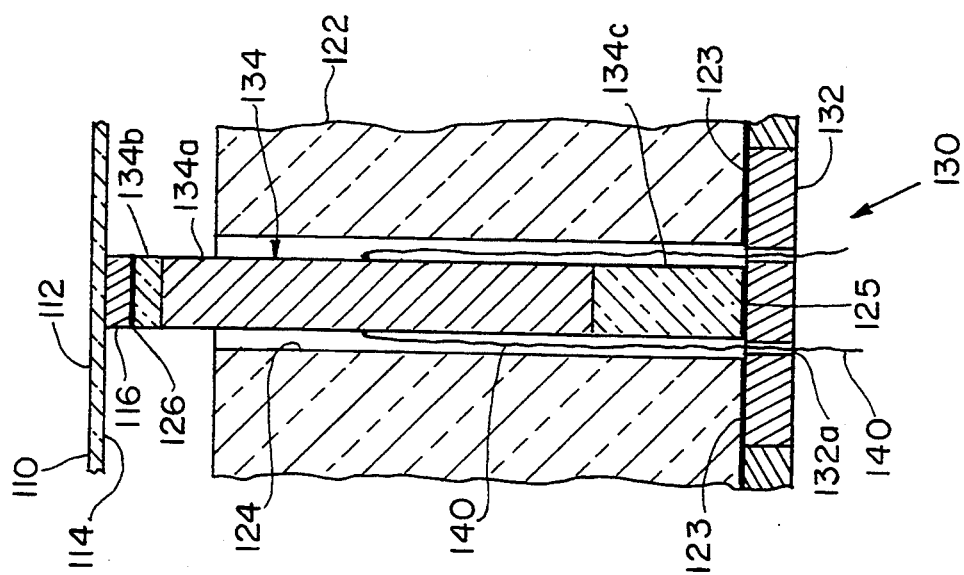
FIG. 5 is a cross-sectional view of another alternative embodiment of the actuator assembly of the present invention.

Other variations are also possible. Most of the advantages of the present invention stem from the fact that the actuator assemblies can be removed from the back of the deformable mirror system after bonds between the assemblies and the substrate have been destroyed. As a result, in other embodiments, a flared bottom ceramic end 134c is used, as shown in FIG. 5. The flared ceramic end 134c' is affixed to the inner walls of the distal end of the bore hole 124 via actuator-substrate epoxy bond 150. The wires 140 are brought out through holes in the flared end 134c'.

While this invention has been particularly shown and describe with references to preferred embodiments thereof, it will be understood by those skilled in the art that various changes in form and details may be made therein without departing from the spirit and scope of the invention as defined by the appended claims.

I claim:

1. In a deformable mirror system comprising:
 a reflective face sheet;
 a substrate positioned behind the face sheet having actuator bore holes extruding entirely through said substrate; and
 actuator assemblies for deforming said face sheet, each one of said actuator assemblies positioned in a different one of the actuator bore holes, said actuator assemblies being bonded to a back surface of the face sheet and being bonded to the substrate;
 wherein each of the actuator assemblies is bonded to a corresponding tile,
 a method for removing an individual one of said actuator assemblies, the method comprising:
 placing a bond between the actuator assembly and the face sheet then exposing the bond to electromagnetic radiation to destroy an adhesive quality of the bond;
 placing a bond between the actuator assembly and the substrate to electromagnetic radiation to destroy the adhesive quality of the bond; and
 placing a bond between the actuator assembly and the corresponding tile and then exposing the bond to electromagnetic radiation to destroy an adhesive quality of the bond; and removing the actuator assembly from the substrate.

2. A method as claimed in claim 1, wherein the electromagnetic radiation is ultra-violet radiation.

3. A method as claimed in claim 2, wherein the ultra-violet radiation is generated by an excimer laser.

4. In a deformable mirror system comprising:
 a reflective face sheet;
 a substrate positioned behind the face sheet having actuator bore holes extruding entirely through said substrate; and
 actuator assemblies for deforming said face sheet, each one of said actuator assemblies positioned in a different one of the actuator bore holes, said actuator assemblies being bonded to a back surface of the face sheet and being bonded to the substrate;
 wherein each of the actuator is bonded to a corresponding tile;
 a method for removing an individual one of tile actuator assemblies, the method comprising:
 placing conductors in a bond between the actuator assembly and the face sheet;
 placing conductors in a bond between the actuator assembly and the substrate;
 placing a conductors in a bond between the actuator assembly and the corresponding tile;
 inducing electrical current in the conductors to heat and destroy an adhesive quality of the bonds; and
 removing the actuator assembly from the substrate.

5. In a deformable mirror system comprising:
 a reflective face sheet;

a substrate positioned behind the face sheet having actuator bore holes extruding entirely through said substrate; and actuator assemblies for deforming said face sheet, each one of said actuator assemblies positioned in a different one of the actuator bore holes, said actuator assemblies being bonded to a back surface of the face sheet and being bonded to the substrate;

wherein each of the actuator is bonded to a corresponding tile;

a method of removing an individual one of said actuator assemblies, the method comprising:

placing a bond between the actuator assembly and the face sheet then heating the bond with a torch to destroy the adhesive quality of the bond;

placing a bond between the actuator assembly and the substrate then heating the bond with a torch to destroy an adhesive quality of the bond;

placing a bond between the actuator assembly and the corresponding tile and then heating the bond with a torch to destroy an adhesive quality of the bond; and removing the actuator assembly from the substrate.

6. In a deformable mirror system comprising:

a reflective face sheet;

a substrate positioned behind the face sheet having actuator bore holes extruding entirely through said substrate; and actuator assemblies for deforming said face sheet, each one of said actuator assemblies positioned in a different one of the actuator bore holes, said actuator assemblies being bonded to a back surface of the face sheet and being bonded to the substrate;

wherein each of the actuator assemblies is bonded to a corresponding tile;

a method for removing an individual one of said actuator assemblies, the method comprising:

placing a ferro-magnetic substance in a bond between the actuator assembly and the face sheet;

placing the ferro-magnetic substance in a bond between the actuator assembly and the substrate;

placing a ferro-magnetic substance in a bond between the actuator assembly and the corresponding tile; and heating the bonds using magnetic induction to destroy the adhesive quality of the bonds; and removing the actuator from the substrate.

7. In a deformable mirror system including a reflective face sheet, a substrate positioned behind the face sheet having actuator bore holes extending entirely through the substrate, and actuator assemblies for deforming the face sheet, each one of the actuator assemblies positioned in a different one of the actuator bore holes, wherein each of the actuator assemblies is bonded to a corresponding tile, the actuator assemblies being bonded to a back surplice of the face sheet and being bonded to the substrate, a method for removing one of the actuator assemblies comprises:

exposing a first bond between the actuator assembly and the face sheet to electromagnetic radiation to destroy an adhesive quality of said first bond;

placing a second bond between the actuator assembly and the substrate and then exposing the second bond to electromagnetic radiation to destroy an adhesive quality of said second bond; and placing a third bond between the actuator assembly and the corresponding tile and then exposing the third bond to electromagnetic radiation to destroy an adhesive quality of the bond;

removing the actuator assembly from the substrate.

8. A method as claimed in claim 7, wherein the actuator assemblies are bonded to the substrate by the second bond near a distal end of the bore holes, and the actuator assemblies comprise actuators that extend through the bore holes and are bonded by the first bond to the face sheet near a proximal end of the bore holes.

9. A deformable mirror system as claimed in claim 7, wherein the actuator assemblies each comprise:

a tile bonded to a back surface of the substrate by the second bond to close a distal end of the actuator bore hole; and actuators bonded to the tiles, extending through the bore hole, and bonded to the face sheet by the first bond near a proximal end of the bore hole.

10. In a deformable mirror system including a reflective face sheet, a substrate position behind the face sheet having actuator bore holes extending entirely through the substrate and actuator assemblies for deforming the face sheet, each one of the actuator assemblies positioned in a different one of the actuator bore holes, the actuator assemblies being bonded to a back surface of the face sheet and being bonded to the substrate, wherein each of the actuator assemblies is bonded to a corresponding tile, a method for removing one of the actuator assemblies comprises:

placing a first bond between the actuator assembly and the face sheet and then heating the first bond to destroy an adhesive quality of said first bond;

placing a second bond between the actuator assembly and the substrate and then heating the second bond to destroy the adhesive quality of said second bond;

placing a third bond between the actuator assembly and the corresponding tile and then exposing the third bond to electromagnetic radiation to destroy an adhesive quality of the third bond; and removing the actuator assembly from the substrate.

11. A method as claimed in claimed in claim 10, further comprising:

placing conductors in the first, second and third bonds; and heating the bonds by inducing electrical current in the conductors.

12. A method as claimed in claim 10, further comprising:

placing ferro-magnetic substances in the first, second and third bonds; and heating the bonds by magnetic induction heating.

13. A method as claimed in claim 10, further comprising:

heating the first bond by exposing a region of the face sheet above the first bond to the heat of a torch;

heating the second bond by exposing a region of the actuator assembly near the second bond to the heat of the torch; and heating the third bond by exposing a region of the actuator assembly near the third bond to the heat of the torch.

* * * * *